(12) United States Patent
Burky et al.

(10) Patent No.: US 7,194,603 B2
(45) Date of Patent: Mar. 20, 2007

(54) SMT FLUSH ARBITRATION

(75) Inventors: William E. Burky, Austin, TX (US); Hung Q. Le, Austin, TX (US); Dung Q. Nguyen, Austin, TX (US); David A. Schroter, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 510 days.

(21) Appl. No.: 10/422,026

(22) Filed: Apr. 23, 2003

(65) Prior Publication Data
US 2004/0215938 A1    Oct. 28, 2004

(51) Int. Cl.
G06F 9/30 (2006.01)
G06F 9/44 (2006.01)

(52) U.S. Cl. ...................... 712/216; 712/228
(58) Field of Classification Search ............. None
See application file for complete search history.

(56) References Cited

U.S. PATENT DOCUMENTS

| | | | | |
|---|---|---|---|---|
| 5,586,278 A | * | 12/1996 | Papworth et al. | 712/235 |
| 5,961,636 A | * | 10/1999 | Brooks et al. | 712/228 |
| 6,240,509 B1 | * | 5/2001 | Akkary | 712/228 |
| 6,363,410 B1 | * | 3/2002 | Kanamori et al. | 718/104 |
| 6,553,480 B1 | * | 4/2003 | Cheong et al. | 712/23 |
| 6,598,152 B1 | * | 7/2003 | Sinharoy | 712/228 |
| 6,694,425 B1 | * | 2/2004 | Eickemeyer | 712/216 |
| 6,754,744 B2 | * | 6/2004 | Kim et al. | 710/56 |
| 6,988,186 B2 | * | 1/2006 | Eickemeyer et al. | 712/217 |

OTHER PUBLICATIONS

Lo, Jack J. et al. "Converting thread-level parallelism to instruction-level parallelism via simulataneous multithreading." ACM transactions on computer systems. Volume 15, No. 3, Aug. 1997. Pages 322-330.*

* cited by examiner

*Primary Examiner*—Eddie Chan
*Assistant Examiner*—Jacob Petranek
(74) *Attorney, Agent, or Firm*—Winstead Sechrest & Minick P.C.

(57) ABSTRACT

A methodology to process flushes in an SMT processor with a dynamically shared group completion table (GCT) and a Flush table comprises identification of incoming flush sources by thread. This uses the forward link array by flush source to determine the next instruction group following the group indicated by the flush source (for example, for mispredicts and load/store flush-next type flushes). Presentation of flush completion table entry numbers or instruction group identifiers (Gtags) to the flush table for computation of oldest flushed group tag corresponding to each thread. The flush selection cycle wherein the flush table outputs are compared against saved versions of all the flush Gtags presented to determine which flush source matches the oldest group output from the flush table. The flush source information is used with the selected oldest Gtag to determine the appropriate additional flushing action to take during the flush cycle.

9 Claims, 4 Drawing Sheets

SMT FLUSH ARBITRATION

TECHNICAL FIELD

The present invention relates in general to methods and circuitry for a processor having simultaneous multithreading (SMT) and single thread operation modes.

BACKGROUND INFORMATION

For a long time, the secret to more performance was to execute more instructions per cycle, otherwise known as Instruction Level Parallelism (ILP), or decreasing the latency of instructions. To execute more instructions each cycle, more functional units (e.g., integer, floating point, load/store units, etc.) have to be added. In order to more consistently execute multiple instructions, a processing paradigm called out-of-order processing (OOP) may be used, and in fact, this type of processing has become mainstream.

OOP arose because many instructions are dependent upon the outcome of other instructions, which have already been sent into the processing pipeline. To help alleviate this problem, a larger number of instructions are stored in order to allow immediate execution. The reason this is done is to find more instructions that are not dependent upon each other. The area of storage used to store the instructions that are ready to execute immediately is called the reorder buffer. The size of reorder buffers have been growing in most modern commercial computer architectures with some systems able to store as many as 126 instructions. The reason for increasing the size of the reorder buffer is simple: code that is spatially related tends also to be temporally related in terms of execution (with the possible exclusion of arrays of complex structures and linked lists). The only problem is that these instructions also have a tendency to depend upon the outcome of prior instructions. With a CPU's ever increasing amount of required code, the only current way to find more independent instructions has been to increase the size of the reorder buffer.

However, using this technique has achieved a rather impressive downturn in the rate of increased performance and in fact has been showing diminishing returns. It is now taking more and more transistors to achieve the same rate of performance increase. Instead of focusing intently upon uniprocessor ILP extraction, one can focus upon a coarser form of extracting performance at the instruction or thread level, via multithreading (multiprocessing), but without the system bus as a major constraint.

The ability to put more transistors on a single chip has allowed on-chip multiprocessing (CMP). To take advantage of the potential performance increases, the architecture cannot use these multiple processors as uniprocessors but rather must use multiprocessing that relies on executing instructions in a parallel manner. This requires the programs executed on the CMP to also be written to execute in a parallel manner rather than in a purely serial or sequential manner. Assuming that the application is written to execute in a parallel manner (multithreaded), there are inherent difficulties in making the program written in this fashion execute faster proportional to the number of added processors.

The general concept behind using multiple cores on one die is to extract more performance by executing two threads at once. By doing so, the two CPUs together are able to keep a higher percentage of the aggregate number of functional units doing useful work at all times. The more functional units a processor has available, the lower the percentage of units doing useful work is at any given time. The on-chip multiprocessor lowers the number of functional units per processor, and distributes separate tasks (or threads) to each processor. In this way, it is able to achieve a higher throughput on both tasks combined. A comparative uniprocessor would be able to get through one thread, or task, faster than a CMP chip could, because, although there are wasted functional units, there are also "bursts" of activity produced when the processor computes multiple pieces of data at the same time and uses all available functional units. One idea behind multiprocessors is to keep the individual processors from experiencing such burst activity times and instead have each processor use what resources it has available more frequently and therefore efficiently. The non-use of some of the functional units during a clock cycle is known as "horizontal waste," which CMP tries to avoid.

However, there are problems with CMP. The traditional CMP chip sacrifices single-thread performance in order to expedite the completion of two or more threads. In this way, a CMP chip is comparatively less flexible for general use, because if there is only one thread, an entire half of the allotted resources are idle and completely useless (just as adding another processor in a system that uses a singly threaded program is useless in a traditional multiprocessor (MP) system). One approach to making the functional units in a CMP more efficient is to use course-grained multithreading (CMT). CMT improves the efficiency with respect to the usage of the functional units by executing one thread for a certain number of clock cycles. The efficiency is improved due to a decrease in "vertical waste." Vertical waste describes situations in which none of the functional units are working due to one thread stalling.

When switching to another thread, the processor saves the state of that thread (i.e., it saves where instructions are in the pipeline, which units are being used) and switches to another one. It does so by using multiple register sets. The advantage of this is due to the fact that often a thread can only go for so long before it falls upon a cache miss, or runs out of independent instructions to execute. A CMT processor can only execute as many different threads in this way as it has support for. So, it can only store as many threads as there are physical locations for each of these threads to store the state of their execution. An N-way CMT processor would therefore need to have the ability to store the state of N threads.

A variation on this concept would be to execute one thread until it has experienced a cache miss (usually a L2 (secondary) cache miss), at which point the system would switch to another thread. This has the advantage of simplifying the logic needed to rotate the threads through a processor, as it will simply switch to another thread as soon as the prior thread is stalled. The penalty of waiting for a requested block to be transferred back into the cache is then alleviated. This is similar to the hit under miss (or hit under multiple miss) caching scheme used by some processors, but it differs because it operates on threads instead of upon instructions. The advantages of CMT over CMP are CMT does not sacrifice single-thread performance, and there is less hardware duplication (less hardware that is halved to make the two processors "equal" to a comparable CMT).

A more aggressive approach to multithreading is called fine-grained multithreading (FMT). Like CMT, the basis of FMT is to switch rapidly between threads. Unlike CMT, however, the idea is to switch each and every cycle. While both CMT and FMT actually do indeed slow down the completion of one thread, FMT expedites the completion of all the threads being worked on, and it is overall throughput which generally matters most.

CMPs may remove some horizontal waste in and unto themselves. CMT and FMT may remove some (or all) vertical waste. However an architecture that comprises an advanced form of multithreading, referred to as Simultaneous Multithreading (SMT), may be used to reduce both horizontal and vertical waste. The major goal of SMT is to have the ability to run instructions from different threads at any given time and in any given functional unit. By rotating through threads, an SMT architecture acts like an FMT processor, and by executing instructions from different threads at the same time, it acts like CMP. Because of this, it allows architects to design wider cores without the worry of diminishing returns. It is reasonable for SMT to achieve higher efficiency than FMT due to its ability to share "unused" functional units among differing threads; in this way, SMT achieves the efficiency of a CMP machine. However, unlike a CMP system, an SMT system makes little to no sacrifice (the small sacrifice is discussed later) for single threaded performance. The reason for this is simple. Whereas much of a CMP processor remains idle when running a single thread and the more processors on the CMP chip makes this problem more pronounced, an SMT processor can dedicate all functional units to the single thread. While this is obviously not as valuable as being able to run multiple threads, the ability to balance between single thread and multithreaded environments is a very useful feature. This means that an SMT processor may exploit thread-level parallelism (TLP) if it is present, and if not, will give full attention to instruction level parallelism (ILP).

In order to support multiple threads, an SMT processor requires more registers than the traditional superscalar processor. The general aim is to provide as many registers for each supported thread as there would be for a uniprocessor. For a traditional reduced instruction set computer (RISC) chip, this implies 32 times N registers (where N is the number of threads an SMT processor could handle in one cycle), plus whatever renaming registers are required. For a 4-way SMT processor RISC processor, this would mean 128 registers, plus however many renaming registers are needed.

Most SMT models are straightforward extensions of a conventional out-of-order processor. With an increase in the actual throughput comes more demands upon instruction issue width, which should be increased accordingly. Because of the aforementioned increase in the register file size, an SMT pipeline length may be increased by two stages (one to select register bank and one to do a read or write) so as not to slow down the length of the clock cycle. The register read and register write stages are therefore both broken up into two pipelined stages.

In order to not allow any one thread to dominate the pipeline, an effort should be made to ensure that the other threads get a realistic slice of the execution time and resources. When the functional units are requesting work to do, the fetch mechanism will provide a higher priority to those threads that have the fewest instructions already in the pipeline. Of course, if the other threads have little they can do, more instructions from the thread are already dominating the pipelines.

SMT is about sharing whatever possible. However, in some instances, this disrupts the traditional organization of data, as well as instruction flow. The branch prediction unit becomes less effective when shared, because it has to keep track of more threads with more instructions and will therefore be less efficient at giving an accurate prediction. This means that the pipeline will need to be flushed more often due to miss prediction, but the ability to run multiple threads more than makes up for this deficit.

The penalty for a misprediction is greater due to the longer pipeline used by an SMT architecture (by two stages), which is in turn due to the rather large register file required. However, techniques have been developed to minimize the number of registers needed per thread in an SMT architecture. This is done by more efficient operating system (OS) and hardware support for better deallocation of registers, and the ability to share registers from another thread context if another thread is not using all of them.

Another issue is the number of threads in relation to the size of caches, the line sizes of caches, and the bandwidth afforded by them. As is the case for single-threaded programs, increasing the cache-line size decreases the miss rate but also increases the miss penalty. Having support for more threads which use more differing data exacerbates this problem and thus less of the cache is effectively useful for each thread. This contention for the cache is even more pronounced when dealing with a multiprogrammed workload over a multithreaded workload. Thus, if more threads are in use, then the caches should be larger. This also applies to CMP processors with shared L2 caches.

The more threads that are in use results in a higher overall performance and the differences in association of memory data become more readily apparent. There is an indication that when the L1 (primary) cache size is kept constant, the highest level of performance is achieved using a more associative cache, despite longer access times. Tests have been conducted to determine performance with varying block sizes that differ associatively while varying the numbers of threads. As before, increasing the associative level of blocks increased the performance at all times; however, increasing the block size decreased performance if more than two threads were in use. This was so much so that the increase in the degree of association of blocks could not make up for the deficit caused by the greater miss penalty of the larger block size.

In an SMT processor with a dynamically shared completion table (GCT), speculative, out-of-order execution presents many difficulties when it is necessary to flush instructions, due to exceptions, branch mispredicts, load/store collisions, debug, etc. The general framework for computing the oldest group being flushed is to use a flush table. The problem with this is that the load/store unit does not always know what group is to be flushed as it is sometimes necessary to flush the next instruction after the instruction being presently executed. Similarly, branch mispredicts, and in some cases exception flushes, need to flush the instruction group following the currently executing instruction. Although the flush table tells us which group was the oldest group to be flushed, it does not identify the source of the flush for the oldest group. This source information is needed for additional actions to control functions such as instruction refetch and the flush window sent to the dispatch pipeline in the dispatch unit. There is, therefore, a need for a method and circuitry to process flushes in an SMT system with a dynamically shared GCT and a flush table such that the flush source is known.

SUMMARY OF THE INVENTION

Execution units generate flush requests as the result of exceptions resulting from executing instructions. These flush requests may be from multiple sources (instruction types) and multiple threads. The execution units send Gtags for the flush instruction groups and any Flush Next bits. The Flush Next bits indicate whether the next instruction group is to be flushed in place of the sent flush group. These Gtags are sent to the GCT and any next instruction groups (FGtags) are retrieved from the forward link array. Logic selects the sent Gtag or the FGtags in response to the Flush Bits or the source and generates selected Gtags (SGtags) by source. The SGtags are saved for each source and are sent to the Flush Array. The Flush Array outputs the oldest Gtag from any source corresponding to the inputted SGtags for each thread. The oldest Gtag from the Flush Array for each thread is compared to the saved SGtags for each source. Up to four matches may be generated for each thread. Any match indicates a source for the oldest group corresponding to the oldest Gtag. If there is only one match, the oldest Gtag group is flushed and action is taken based on its determined source. If more that one match is generated, then priority logic selects one oldest Gtag with the highest priority. The highest priority group corresponding to the matched oldest Gtag is flushed and action is taken based on its determined source.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
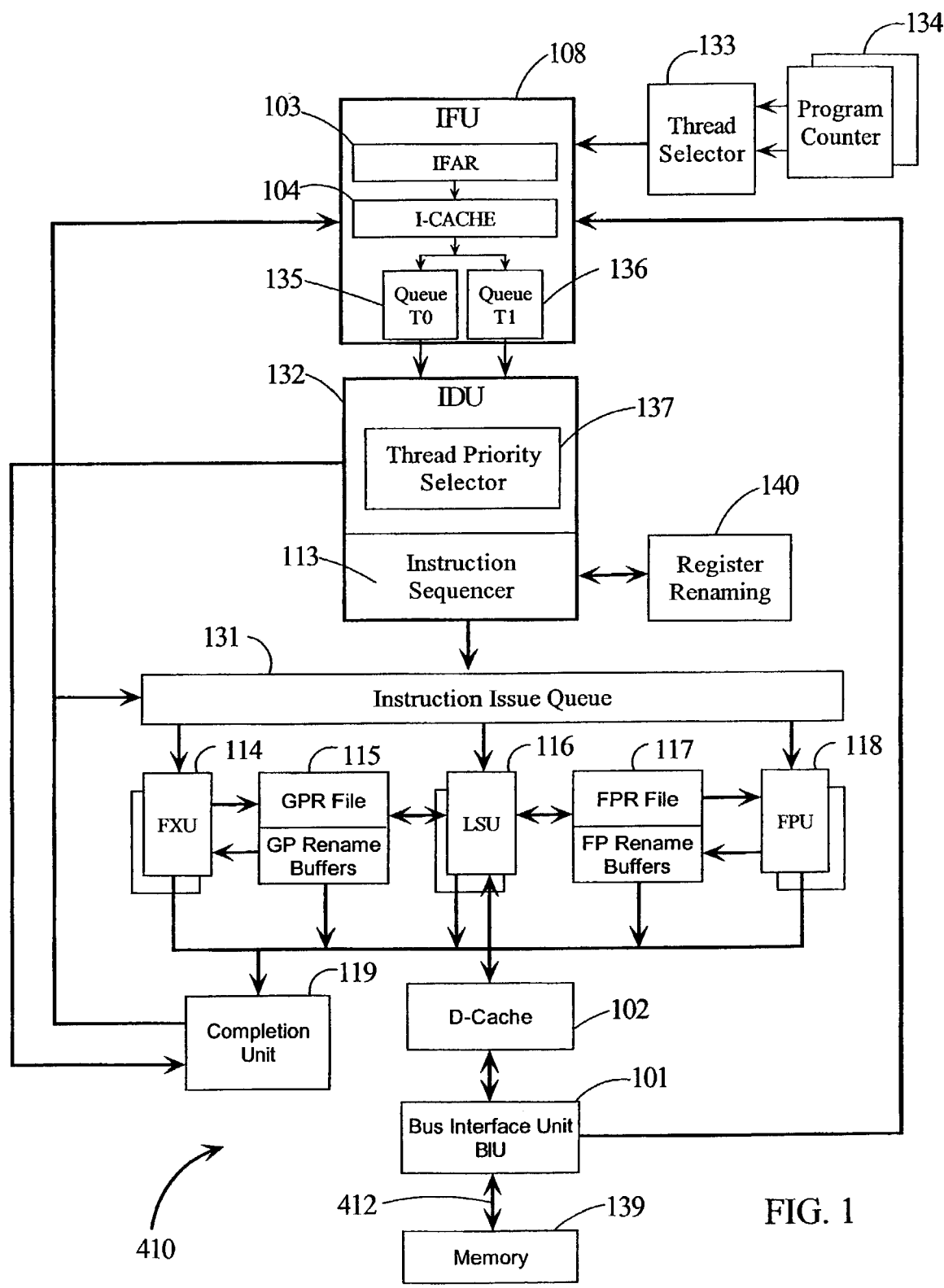
FIG. 1 is a block diagram of functional units in an SMT processor according to embodiments of the present invention.

In the following description, numerous specific details are set forth to provide a thorough understanding of the present invention. However, it will be obvious to those skilled in the art that the present invention may be practiced without such specific details. In other instances, well-known circuits may be shown in block diagram form in order not to obscure the present invention in unnecessary detail. For the most part, details concerning timing, data formats within communication protocols, and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring to FIG. 1, there are illustrated details of CPU 410. CPU 410 is designed to execute multiple instructions per clock cycle. Thus, multiple instructions may be executing in any of the execution units, fixed point units (FXUs) 114, floating point units (FPUs) 118, and load/store units (LSUs) 116 during any one clock cycle. Likewise, CPU 410 may simultaneously execute instructions from multiple threads in an SMT mode.

Program counters (PCs) 134 correspond to thread zero (T0) and thread one (T1) that have instructions for execution. Thread selector 133 alternately selects between T0 and T1 to couple an instruction address to instruction fetch unit (IFU) 108. Instruction addresses are loaded into instruction fetch address register (IFAR) 103. IFAR 103 alternately fetches instructions for each thread from instruction cache (I-Cache) 104. Instructions are buffered in instruction queue (IQ) 135 for T0 and IQ 136 for T1. IQ 135 and IQ 136 are coupled to instruction dispatch unit (IDU) 132. Instructions are selected and read from IQ 135 and IQ 136 under control of thread priority selector 137. Normally, thread priority selector 137 reads instructions from IQ 135 and IQ 136 substantially proportional to each thread's program controlled priority.

The instructions are decoded in a decoder (not shown) in IDU 132. Instruction sequencer 113 then may place the instructions in groups in an order determined by various algorithms. The groups of instructions are forwarded to instruction issue queue (IIQ) 131. The instruction sequencer 113 receives instructions from both threads in program order, but the instructions may be issued from the IIQ 131 out of program order and from either thread. The general purpose register (GPR) file 115 and floating point register (FPR) file 117 are used by multiple executing units and represent the program state of the system. These hardware registers may be referred to as the "architected" registers. When an instruction is put into an issue queue, each architected register is renamed. Each architected register that is being modified is assigned a physical register and a corresponding look-up table identifies physical registers that are associated with an architected register. Therefore in the issue queue, the architected register has been renamed so that multiple copies of an architected register may exist at the same time. This allows instructions to be executed out-of-order as long as source operands are available. Register renaming unit 140, renames and maps the registers so that unused physical registers may be reassigned when all instructions referencing a particular physical register complete and the physical register does not contain the latest architected state.

Instructions are queued in IIQ 131 for execution in the appropriate execution unit. If an instruction contains a fixed point operation, then any of the multiple fixed point units (FXUs) 114 may be used. All of the execution units, FXU 114, FPU 118 and LSU 116 are coupled to completion unit 119 that has completion tables (not shown) indicating which of the issued instructions have completed and other status information. Information from completion unit 119 is forwarded to IFU 108. IDU 132 may also send information to completion unit 119. Data from a store operation from LSU 116 is coupled to data cache (D-Cache) 102. This data may be stored in D-Cache 102 for near term use and/or forwarded to bus interface unit (BIU) 101 which sends the data over bus 412 to memory 139. LSU 116 may load data from D-Cache 102 for use by the execution units (e.g., FXU 114).

Operation of a shared group completion table (GCT) in an SMT processor is described in detail in U.S. Pat. No. 6,721,874 entitled "Method and System for Dynamically Shared Completion Table Supporting Multiple Threads In A Processing System," with a filing date of Oct. 12, 2000. This application is incorporated by reference in the present application.

In the shared GCT for SMT, the completion unit provides link lists for each of the threads wherein each entry associated with a thread is linked to the next entry (forward link array) and to a previous entry (backward link array). One or more conditions may occur requiring a flush operation. Since there are multiple execution units there may be more than one type of instruction (source) generating the exception conditions requiring a flush operation. In the prior art, the completion unit determined the "oldest" group that needed to be flushed, generated the necessary flush mask, and restored the GCT to its appropriate state. The flush mask, as a vector of bits that corresponded to the groups that needed to be discarded or flushed, was broadcast to all the execution units so that each execution unit could discard the flushed instructions. In the prior art, there was no consideration given to the source of the condition generating the flush request.

If an execution unit issues a flush request, it typically identifies the thread and the source of the flush that caused the exception requiring a flush. In some cases, the instruction group identified by the execution unit is flushed and at other times the next group needs to be flushed. This is identified by a flush next bit from the execution unit.

The flush array keeps track of the oldest group being flushed by thread. During a clock cycle, up to four sources may generate a flush request. All four may be from one thread or distributed between the two threads. The instruction group identifiers (Gtags) from the sources are sent to the group completion table (GCT) and the forward link array is accessed to retrieve any forward link Gtag (FGtag) corresponding to the next group for the received Gtag.

Figure 2:
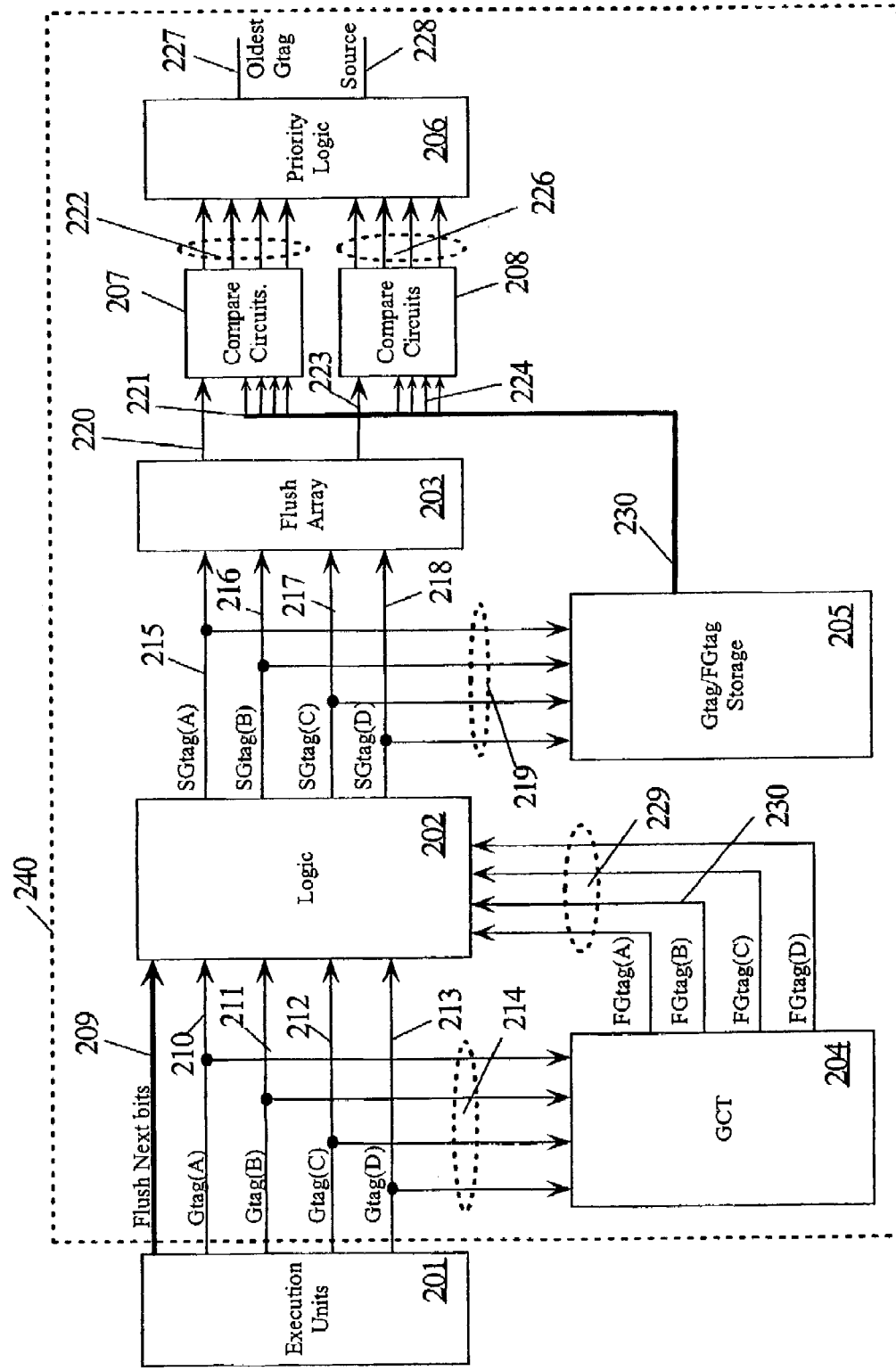
FIG. 2 is a block diagram of circuitry for implementing method steps of embodiments of the present invention.

FIG. 2 is a block diagram of functional units used in embodiments of the present invention. Exemplary execution units 201 (e.g., similar to execution units 114, 11116, and 118 in FIG. 1) generate flush requests in response to executing instructions that cause various exception conditions. Execution units 201 are coupled to a completion unit 240 (similar to completion unit 119 in FIG. 1) that has logic 202, flush array 203, GCT 204, storage unit 205, compare circuits 207 and 208, and priority logic 206. The instruction group identifier (Gtag) for the instructions requesting a flush are forwarded along with an Flush Next bits to logic 202. In embodiments of the present invention, a Gtag identifies a group of five instructions for a particular thread. Since there are four possible sources, the Gtags are written as Gtag (A), Gtag (B), Gtag (C) and Gtag (D). Some sources automatically use the Gtag of its next group of instructions in the flush cycle and some sources require the Flush Next bits to make this determination. The Gtags 214 are sent to group completion table (GCT) 204. The GCT 204 outputs any Gtag from the forward link array (FGtag) to logic 202. FGtags identify next instruction groups corresponding to a sent Gtag from an execution unit. Depending on the source of the Gtags 214 and the state of the corresponding Flush Next bits 209, either a Gtag 214 (e.g., Gtag (A) 210) or a FGtag 229 (e.g., FGtag (B) 230) is forwarded as a selected Gtag (SGtag). For example, if Gtag 210 was selected, it would output as SGtag 215 and if FGtag (B) 230 was selected it would output as SGtag 216. The SGtags 219 are saved in storage unit 205. The stored SGtags 219 are outputted on lines 230 and coupled to compare circuits 207 and 208. The SGtags 219 are coupled to Flush Array 203 which outputs an oldest Gtag (Gtag 220 and Gtag 223) for each thread corresponding to the received SGtags of the corresponding thread. For example Gtag 220 may correspond to thread zero (T0) and Gtag 223 may correspond to thread one (T1).

Compare circuits 207 and 208 are implemented on a per thread basis. In FIG. 2, comparator 207 is for T0 and comparator 208 is for T1. Compare circuits 207 and 208 comprise four comparators each, wherein each comparator receives the outputted oldest Gtag (e.g., Gtag 220 or Gtag 223) from Flush Array 203 and one of the stored Gtags/FGtags 230. Compare circuits 207 and 208 may each generate up to four matches each. If only one match is generated, then priority logic 206 outputs the selected oldest Gtag 227 and its source 228. This source information is used to determine if any additional action is to be taken in response to the flush of the selected Gtag 227. If outputs 222 and 226 have more than one match, then priority logic 206 arbitrates according to an algorithm and selects one highest priority to output as Gtag 227 along with its source identifier 228.

Figure 3:
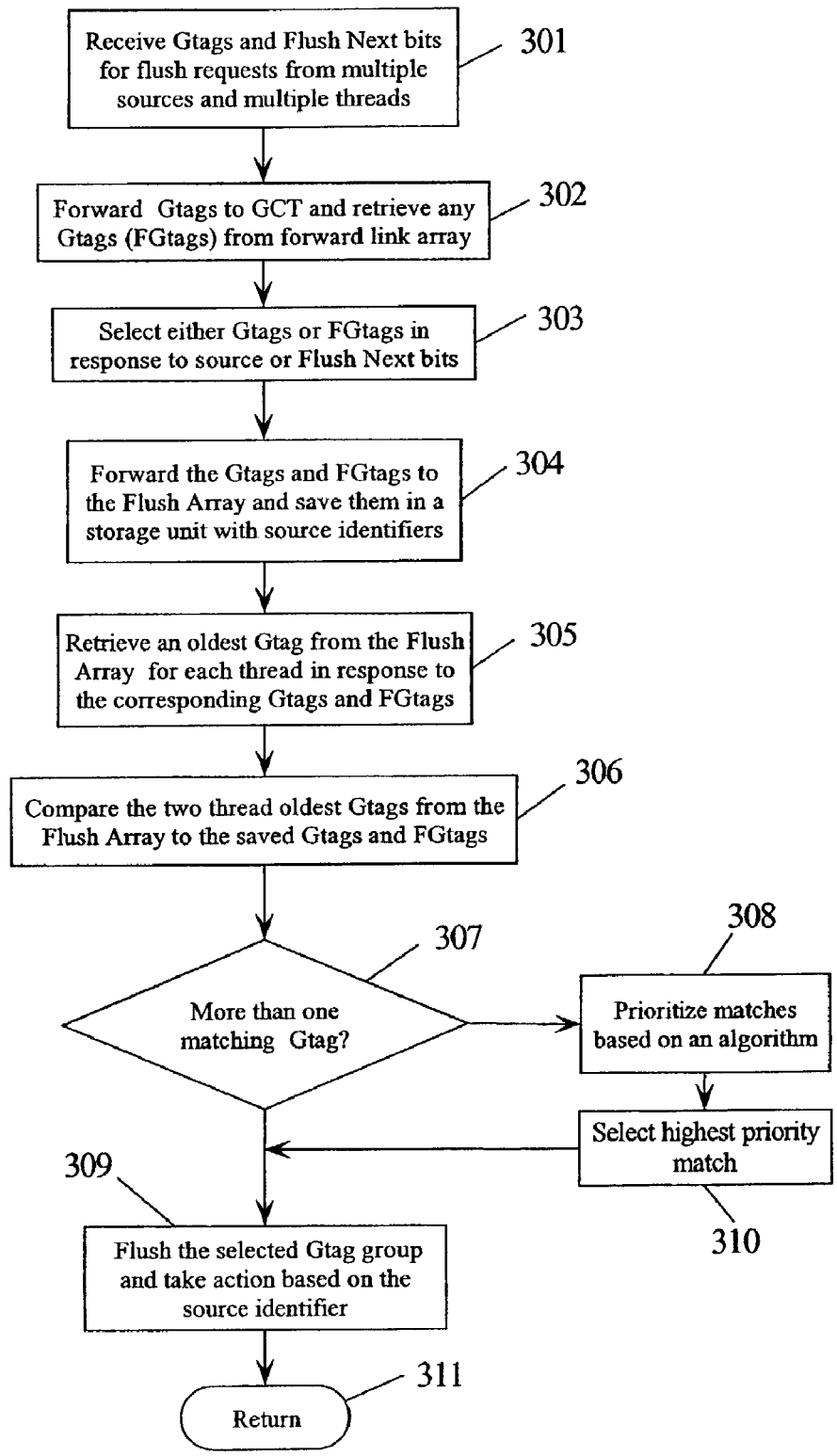
FIG. 3 is a flow diagram of method steps according to embodiments of the present invention.

FIG. 3 is a flow diagram of method steps used in embodiments of the present invention. In step 301, Gtags and Flush Next bits of up to four flush groups from multiple sources (e.g., A–D) and multiple threads are received in logic 202 from execution units 201. In step 302, these Gtags 214 are also sent to GCT 204 where the forward link array is accessed and returns Gtags of any next instruction groups (FGtags) 229 corresponding to the Gtags 214. In step 303, for each source, either a Gtag from Gtags 214 or a FGtag from FGtags 229 is selected in response to the source type or the Flush Next bits. In step 304, the selected Gtags and FGtags are sent to the Flush array and they are saved in a storage register. In step 305, the oldest Gtag from the Flush array for each thread is retrieved corresponding to the inputted selected Gtags and FGtags. In step 306, the oldest Gtag for T0 and the oldest Gtag for T1 are each compared to all of the saved Gtags or FGtags. In step 307, a test is done to determine if there are more than one match. If the result of the test in step 307 is NO, then in step 309 the oldest Gtag group is flushed and action is taken based on its source. If the result of the test in step 307 is YES, then in step 308 the multiple matches are prioritized. In step 310, the highest priority Gtag is selected and a branch is taken to step 309 where the highest priority Gtag group is flushed and action is taken based on its source identifier. In step 311, a return is taken to step 301 to receive any new Gtags resulting from flush requests.

Figure 4:
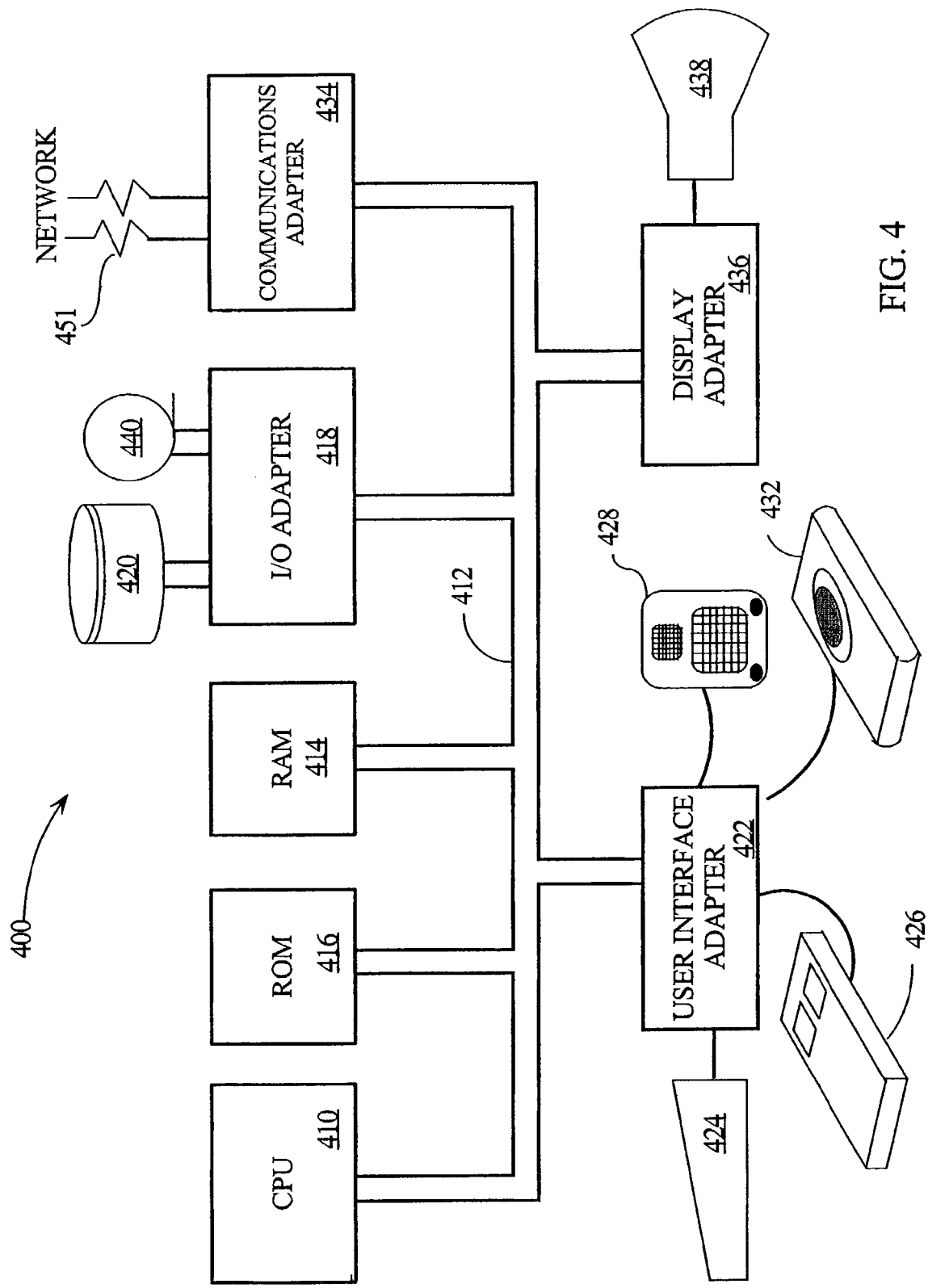
FIG. 4 is a representative hardware environment for practicing the present invention.

A representative hardware environment for practicing the present invention is depicted in FIG. 4, which illustrates a typical hardware configuration of a workstation in accordance with the subject invention having central processing unit (CPU) 410 with simultaneous multithread (SMT) processing and a number of other units interconnected via system bus 412. The workstation shown in FIG. 4 includes random access memory (RAM) 414, read only memory (ROM) 416, and input/output (I/O) adapter 418 for connecting peripheral devices such as disk units 420 and tape drives 440 to bus 412, user interface adapter 422 for connecting keyboard 424, mouse 426, speaker 428, microphone 432, and/or other user interface devices such as a touch screen device (not shown) to bus 412, communication adapter 434 for connecting the workstation to a data processing network, and display adapter 436 for connecting bus 412 to display device 438.

Although the present invention and its advantages have been described in detail, it should be understood that various changes, substitutions and alterations can be made herein without departing from the spirit and scope of the invention as defined by the appended claims.

What is claimed is:

1. A method for selecting among a plurality of flush requests from multiple instruction threads in a simultaneous multithread (SMT) processor with a shared group completion table (GCT) comprising the steps of:
   receiving instruction group identifiers (Gtags) and flush next bits corresponding to each of said plurality of flush requests;
   coupling said Gtags as inputs to said GCT and retrieving any forward link Gtags (FGtags) for each Gtag;
   selecting said Gtags or FGtags as selected Gtags and FGtags in response to logic states of said flush next bits;
   coupling said selected Gtags and FGtags to a flush array;
   saving said selected Gtags and FGtags in a storage unit with source identifiers; and
   flushing either a Gtag group corresponding to a single match or a highest priority Gtag group if more than one match is found and take an action based on its corresponding source identification.

2. The method of claim 1 further comprising the steps of:
   retrieving an oldest Gtag from said flush array for each thread in response to said corresponding selected Gtags and FGtags; and
   comparing an oldest Gtag for each of said threads from said flush array to saved Gtags and FGtags.

3. The method of claim 2 further comprising the steps of:
   determining if one or more saved Gtags and FGtags for each thread compares with its corresponding oldest Gtag from said flush array; and
   prioritizing said flush requests corresponding to said saved Gtags and FGtags using an algorithm if more than one match is found.

4. A simultaneous multithread (SMT) processor comprising:
   a shared group completion table for first and second threads;
   circuitry for receiving instruction identification tags (Gtags) and flush next bits corresponding to each of said plurality of flush requests;
   circuitry for coupling said Gtags as inputs to the GCT and retrieving any forward link Gtags (FGtags) for each corresponding Gtag;
   circuitry for selecting said Gtags or FGtags as selected Gtags and FGtags in response to logic states of said flush next bits;
   circuitry for coupling said selected Gtags and FGtags to a flush array;
   circuitry for saving said selected Gtags and FGtags in a storage unit with source identifiers; and
   circuitry for flushing either a Gtag group corresponding to a single match or a highest priority Gtag group if more than one match is found and take action based on its corresponding source identification.

5. The processor of claim 4 further comprising:
   circuitry for retrieving an oldest Gtag from said flush array for each thread in response to said corresponding selected Gtags and FGtags; and
   circuitry for comparing an oldest Gtag for each of said threads from said flush array to saved Gtags and FGtags.

6. The processor of claim 5 further comprising:
   circuitry for determining if one or more saved Gtags and FGtags for each thread compares with its corresponding oldest Gtag from said flush array; and
   circuitry for prioritizing said flush requests corresponding to said saved Gtags and FGtags using an algorithm if more than one match is found.

7. A data processing system comprising:
   a central processing unit (CPU) having a multithread (SMT) processor;
   a random access memory (RAM);
   an input output (I/O) adapter;
   a communications adapter;
   a bus coupling said CPU, RAM, I/O adapter, and said communications adapter;
   a shared group completion table (GCT);
   a flush array for selecting which instruction group to flush in response to a plurality of flush requests from multiple threads and multiple sources;
   circuitry for receiving instruction identification tags (Gtags) and flush next bits corresponding to each of said plurality of flush requests;
   circuitry for coupling said Gtags as inputs to the GCT and retrieving any forward link Gtags (FGtags) for each corresponding Gtag;
   circuitry for selecting said Gtags or FGtags as selected Gtags and FGtags in response to logic states of said flush next bits;
   circuitry for coupling said selected Gtags and FGtags to a flush array;
   circuitry for saving said selected Gtags and FGtags in a storage unit with source identifiers; and
   circuitry for flushing either a Gtag group corresponding to a single match or a highest priority Gtag group if more than one match is found and take action based on its corresponding source identification.

8. The data processing system of claim 7 further comprising:
   circuitry for retrieving an oldest Gtag from said flush array for each thread in response to said corresponding selected Gtags and FGtags; and
   circuitry for comparing an oldest Gtag for each of said threads from said flush array to saved Gtags and FGtags.

9. The data processing system of claim 8 further comprising:
   circuitry for detennining if one or more saved Gtags and FGtags for each thread compares with its corresponding oldest Gtag from said flush array; and
   circuitry for prioritizing said flush requests corresponding to said saved Gtags and FGtags using an algorithm if more than one match is found.

* * * * *